(12) United States Patent
Chen et al.

(10) Patent No.: US 8,717,873 B2
(45) Date of Patent: May 6, 2014

(54) MODEM ADAPTATION CONTROL FOR FACSIMILE OVER INTERNET PROTOCOL

(75) Inventors: Ximing Chen, Ringoes, NJ (US);
Herbert B. Cohen, Allentown, PA (US);
Jianqiang Xin, Clinton, NJ (US)

(73) Assignee: LSI Corporation, Milpitas, CA (US)

( * ) Notice: Subject to any disclaimer, the term of this patent is extended or adjusted under 35 U.S.C. 154(b) by 49 days.

(21) Appl. No.: 13/480,719

(22) Filed: May 25, 2012

(65) Prior Publication Data

US 2013/0315052 A1    Nov. 28, 2013

(51) Int. Cl.
*G01R 31/08*    (2006.01)
(52) U.S. Cl.
USPC ............................................ 370/216; 370/467
(58) Field of Classification Search
USPC .................................................. 370/216, 467
See application file for complete search history.

(56) References Cited

U.S. PATENT DOCUMENTS

| 6,865,220 | B2 | 3/2005 | Abrishami |
| 7,899,038 | B2 | 3/2011 | Ulybin |
| 2002/0085558 | A1 | 7/2002 | George |
| 2003/0112796 | A1* | 6/2003 | Kwan ........................... 370/352 |
| 2003/0123464 | A1 | 7/2003 | Lee et al. |
| 2006/0268831 | A1 | 11/2006 | Ulybin |
| 2012/0110403 | A1 | 5/2012 | Chen et al. |

OTHER PUBLICATIONS

Rafiq, Yaser; Bashir, Omar; Shah, Syed Ismail; Khan, Shoab A.; FoIP Gateways—Architectures, Implementation and QoS Issues.
Hanes, David and Salgueiro, Gonzalo; Fax, Modem, and Text for IP Telephon; Chapter 4: Passthrough; Aug. 12, 2008; pp. 1-14; http://www.networkworld.com/subnets/cisco/081308-ch4-ip-telephony.html.

* cited by examiner

*Primary Examiner* — Sai-Ming Chan (57) ABSTRACT

Described embodiments provide an IP-aware modem, such as for use in an IP-aware facsimile machine, operable with an IP packet network. The IP-aware modem has voice-band data engine that receives packets from the packet network, converts data in the packets to PCM samples, stores the samples as PCM sample frames in a buffer for further processing by the modem, and determines for each PCM sample frame whether or not during the conversion one or more packets were missing. An equalizer or timing recovery element in the modem adapts using the PCM sample frames and suspends the adaptation for the time period of each PCM sample frame converted without the one or more missing packets. Similarly, searches of the PCM sample frames for certain modem synchronization signals are skipped when, during the search, the searched PCM sample frame was converted without the one or more missing packets.

22 Claims, 6 Drawing Sheets

MODEM ADAPTATION CONTROL FOR FACSIMILE OVER INTERNET PROTOCOL

CROSS-REFERENCE TO RELATED APPLICATIONS

The subject matter of this application is related to U.S. patent application Ser. No. 12/917,635, filed on 2 Nov. 2010, the teachings of which are incorporated by reference herein in its entirety.

BACKGROUND OF THE INVENTION

A traditional analog facsimile (or "fax") generally involves the transmission of scanned-in printed material (e.g., text, photographs, or the like), usually to a telephone number associated with a printer or other output device via a public switched telephone network (PSTN), as specified, for example, in the International Telecommunication Union (ITU) T.30 standard (see, e.g., ITU-T Recommendation T.30, Procedures for Document Facsimile Transmission in the General Switched Telephone Network, SERIES T: TERMINALS FOR TELEMATIC SERVICES, September 2005, the disclosure of which is incorporated by reference herein in its entirety). After a call is established between a source facsimile machine and a receiving facsimile machine, the two machines are synchronized to each other, an original source document is scanned in by the source facsimile machine that treats the contents as a single fixed graphic image and converts the image into a bitmap. Once in this digital form, the information is transmitted as audio-frequency signals through the telephone system. The receiving facsimile machine converts the coded image to print a paper copy of the document. Alternatively, computers can be used as the source or receiving facsimile machine in which the originating document and the received copy of the document are stored electronically.

Instead of using the PSTN, voice transmission of voice over the Internet using Voice over Internet Protocol (VoIP) technology is becoming popular. Concomitantly, it is desirable to use the same Internet Protocol (IP) network used to transmit VoIP traffic for facsimile communication by connecting traditional analog facsimile machines to the IP network and using Facsimile over Internet Protocol (FoIP) technology specified, for example, in the International Telecommunication Union (ITU) T.38 standard (see, e.g., ITU-T Recommendation T.38, Group 3 Protocols, Procedures for Real-time Group 3 Facsimile Communication Over IP Networks, SERIES T: TERMINALS FOR TELEMATIC SERVICES, FACSIMILE, April 2007, the disclosure of which is incorporated by reference herein in its entirety).

The T.38 fax protocol supports the transmission of facsimile data across an IP network in real time, much like the original Group 3 (G3) fax standards did for PSTN. In this manner, T.38 preserves the traditional fax environment and yet allows faxes to be successfully sent and received by dynamically adjusting the transmitted fax signal to compensate for jitter, latency, and packet loss, which are common in the IP network. Without T.38, fax devices, which are sensitive to timing, would otherwise experience difficulty reliably sending and receiving faxes over an IP network. However, while the T.38 fax protocol addresses some of the problems associated with sending and receiving faxes in real-time over a packet network, several problems remain.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment of the invention, a method for operating an IP-aware modem coupled to a packet network is described. The modem receives packets from the packet network and determines if one or more packets are missing. An equalizer or timing recovery element in the modem adapts using data in the received packets. If one or more missing packets are detected, then the adaptation is suspended for a period of time. Similarly, searches for certain modem synchronization signals are skipped when, during the search, it is detected that one or more packets are missing.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise.

The present invention will be described herein in the context of illustrative embodiments of a universal facsimile engine adapted to be for use with an Internet Protocol (IP) network. It is to be appreciated, however, that the invention is not limited to the specific apparatus and methods illustratively shown and described herein. Rather, aspects of the invention are directed broadly to techniques for beneficially integrating features of facsimile and IP protocols.

While illustrative embodiments of the invention will be described herein with reference to ITU-T T.30 protocol, it is to be appreciated that the invention is not limited to use with this particular protocol. Rather, principles of the invention may be extended to essentially any facsimile communications protocol, both standard and non-standard. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
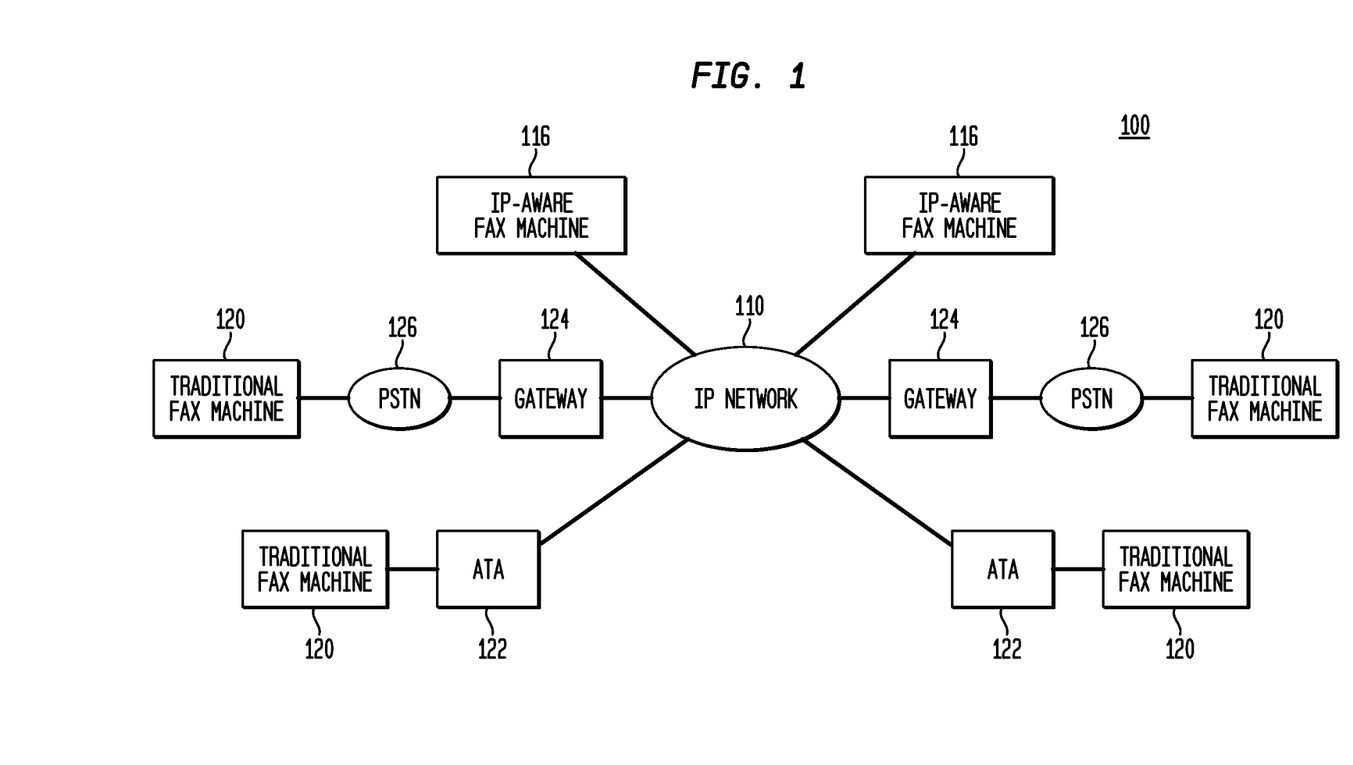
FIG. 1 shows a block diagram of an IP network-based communications system illustrating various ways of interfacing facsimile devices to the network.

FIG. 1 is a simplified block diagram of a communication system 100, based on a conventional Internet Protocol (IP) network 110, used in this example for facsimile transmission. Three basic techniques for coupling a facsimile device, such as a facsimile ("fax") machine, to the network 100 are illustrated. For two of the techniques, conventional fax machines 120 are coupled to the network 110, either using an analog telephone adapter 122 to couple the fax machine 120 to the network 110, or a gateway 124 in conjunction with a telephone network 126, such as the PSTN, to couple the fax machine 120 to the gateway 124. The term "gateway" as used herein is intended to broadly refer to a device, node or other functional unit operative in a communications network to interface with another network that uses different communications protocols. A gateway generally performs protocol translation/mapping for interconnecting networks with different network protocol technologies. The details of the fax machines 120 will be discussed in more detail in connection with FIG. 2, and the details of the ATA 122 and the gateways 124 will be discussed in more detail in connection with FIG. 3. For purposes here, the fax machines may either use a conventional analog interface, such as wire-pair (tip and ring) loop, or have a digital interface, such as ISDN, to couple the fax machine to the telephone network 126 or the ATA 124. Further, the ATA 122 and the gateway 124 are each capable of supporting voice-band data (VBD) over IP networks in accordance with the International Telecommunication Union (ITU) V.152 standard (see, e.g., ITU-T Recommendation V.152, "Procedures for supporting voice-band data over IP networks", SERIES V: DATA COMMUNICATION OVER THE TELEPHONE NETWORK, Interworking with other networks, January 2005, the disclosure of which is incorporated by reference herein in its entirety). The last technique illustrated here for coupling a fax machine to the network 100 is by using an integrated device 116 that provides facsimile operation and attaches to the network 100 forming an "IP aware" fax machine that, like the ATA 122 and gateway 124, is capable of supporting VBD over IP networks in accordance with the International Telecommunication Union (ITU) V.152 standard. It is understood that other techniques may be used to couple a facsimile-capable device to the network 110.

Figure 2:
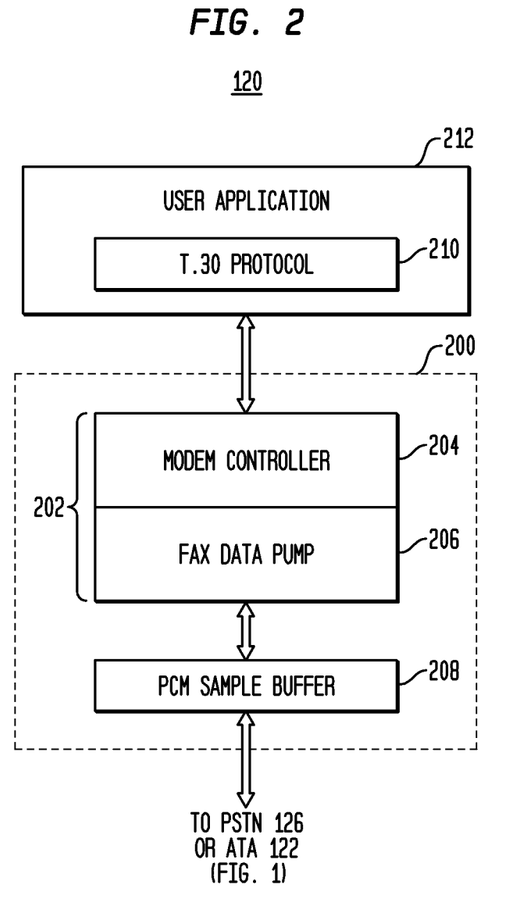
FIG. 2 is a block diagram depicting an illustrative dedicated analog facsimile engine adapted to provide facsimile transmission over a standard PSTN.

FIG. 2 is a block diagram depicting an illustrative stand-alone or dedicated fax machine 120 comprising a fax engine 200 and a user application 212. The user application, described below, processes facsimile image data for transmission by, and received by, the fax engine 200. As apparent from the figure, fax engine 200 comprises a dedicated fax modem 202 having a modem controller 204 coupled to a fax data pump 206. The fax engine 200 preferably further includes a Pulse Code Modulation (PCM) sample buffer 208 that operatively couples to the fax data pump 206. The PSTN sample buffer 208 is operative to provide an interface between the fax engine 200 and the PSTN 126 or the ATA 122 (FIG. 1).

The fax modem 202 is preferably compliant with ITU V.34/V.17/V.29/V.27ter (see, e.g., ITU-T Recommendation V.34, "A modem operating at data signaling rates of up to 33 600 bit/s for use on the general switched telephone network and on leased point-to-point 2-wire telephone-type circuits", SERIES V: DATA COMMUNICATION OVER THE TELEPHONE NETWORK, Interfaces and voice-band modems, February 1998, the disclosure of which is incorporated by reference herein in its entirety). The PCM samples stored in the buffer 208 are generally conventional linear, μ-law, or a-law encoded digital samples of analog signals specified by the relevant (e.g., V.34) standard.

A modem implementing the V.34 or earlier (slower) standards (such as V.17/V.29/V.27ter) has in it a set of equalizers and timing recovery functions or modules (not shown) that are capable of adapting to the communications path, e.g., a telephone line, the modem is connected to. The equalizers help to reduce the effects of distortions that impair a data signal as it passes through the communications path. The timing recovery function recovers the sampling clock of the data signals so that the receiver in the modem is synchronized to the source of the data signals (a transmitter) coupled to the far end of the communications line. A routine in the modem changes filter coefficients within the equalizers and the frequency/phase of clocks in the timing recovery function to adapt them to the present conditions by first training the modem to the transmitter as the transmitter sends a known signal to the receiver for a period of time until the receiver indicates to the transmitter that it has adapted sufficiently to begin normal operation, i.e., receiving data. Then, during normal operation, the equalizers and timing recovery functions continue to adapt to changes in the conditions, albeit at a slower rate than during the training period. Typically, the equalizers and timing recovery functions are implemented in a general-purpose computer (e.g., a personal computer), in a digital signal processor, or in dedicated digital circuitry (e.g., in an application-specific integrated circuit or ASIC) either alone or part of the rest of the facsimile machine 120. The details of the modem 202 is well known in the art and not discussed in further detail here.

The user application 212 is a program executed in dedicated hardware, such as a digital signal processor (DSP), or is a widely available software application for use on a personal computer or the like. The application 212 preferably employs a T.30 protocol 210, which may be implemented as part of the user application, for communicating with the fax engine 200.

Conversely, the T.30 protocol may be implemented externally to the user application, such as by a proxy residing between the user application and the fax engine 200. Fax image data, representative of printed materials (e.g., text, photographs, or the like) to be transmitted, are sent from the application 212 to the fax engine 200, where they are properly formatted by the modem controller 204 and modulated by the fax data pump 206 for transmission.

Figure 3:
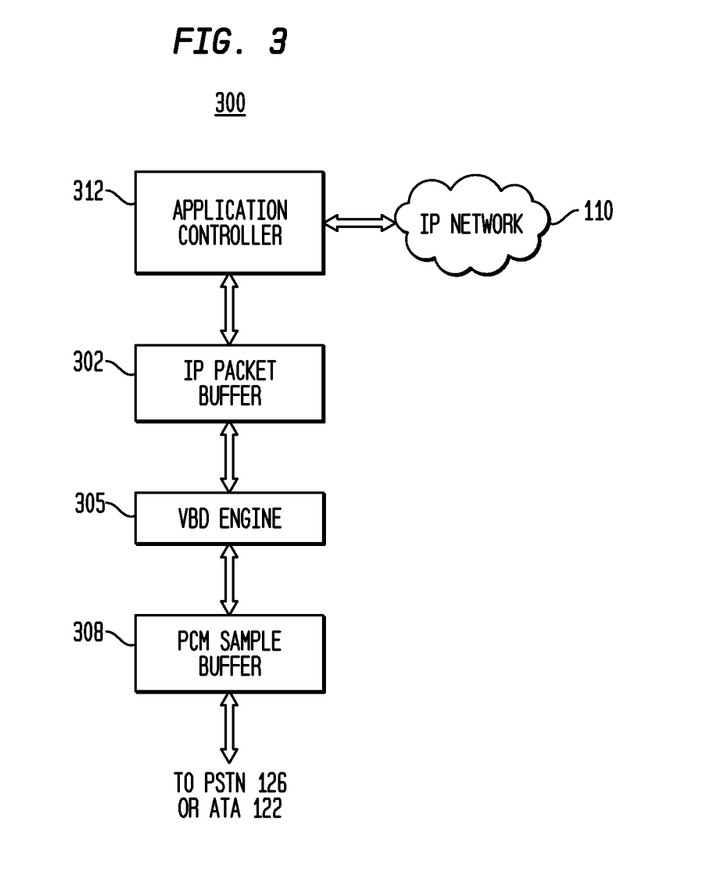
FIG. 3 is a block diagram depicting an illustrative IP-aware facsimile engine for use in a gateway or ATA.

FIG. 3 is a block diagram depicting an illustrative dedicated IP-aware FoIP media gateway or ATA (124 and 122, respectively, in FIG. 1) 300. The IP-aware gateway/ATA 300 is operative to interface between the IP network 110 and a conventional fax machine 120 (FIG. 1), coupled either directly or via a switched (non-packetized) network, such as the PSTN 126, to the gateway/ATA 300. The gateway/ATA 300 uses, for example, a VBD engine 305 to process the fax signals from a fax machine (e.g., 120 in FIG. 1) and an application controller 312 that includes call setup and signaling protocols such as SIP or H.323, and operates as an interface to the IP network 110. SIP and H.323 protocols are described, respectively, in the Internet Engineering Task Force (IETF) Request for Comment (RFC) 2543 (1999) "SIP: Session Initiated Protocol" and ITU-T Recommendation H.323 (see, e.g., ITU-T Recommendation H.323, Series H: Audiovisual and Multimedia Systems, Infrastructure of audiovisual services—Systems and terminal equipment for audiovisual services, Packet-based multimedia communications systems, December 2009, and incorporated herein by reference in their entirety. An alternative control and/or signaling protocol can be used as well.

Gateway/ATA 300, like fax engine 200 shown in FIG. 2, has a PCM sample buffer 308. The gateway/ATA 300 also comprises an IP fax packet buffer 302 operatively coupled to the application controller 312. The IP fax packet buffer 302 is preferably operative to receive data packets from the VBD engine 305 and buffers them for transmission to the IP network 110 via application controller 312. Likewise, packets received from the IP network 110 by the application controller 312 are buffered by the buffer 302 for use by the VBD engine 305. In this manner, application controller 312 provides an interface to the IP network 110.

Data from the received packets (e.g., payload, timing information, packet numbering, etc.), buffered by the buffer 302, are processed by the VBD engine 305 to generate PCM sample data for buffering by the buffer 308. Likewise, samples received from the PSTN 126 or dedicated fax machine 120 (for the case of an ATA 122) and buffered by the PCM sample buffer 308 are processed (e.g., reformatted) by the VBD engine 305 and the resulting packet data is buffered by the buffer 302 for eventual transmission over the network 110 by application controller 312. In this manner, PCM sample buffer 308 is operative to provide an interface to the PSTN 126 or dedicated fax machine 120.

While VBD-based IP-aware gateways, ATAs, and fax machines are known, generally they suffer from operational failure (e.g., a dropped fax communication) when the IP network 110 is impaired by, for example, dropped or delayed packets, jitter, etc. This typically occurs because the T.30 protocol and fax modem was designed to be used over a switched (non-packetized) network (e.g., PSTN) that provides relatively smooth and uninterrupted data flows. The fax modem does not receive any real-time information on packet network impairments and, therefore, can only treat the degradation of the received packets the same way it treats degradations of an analog fax signal—by adapting the digital filters and clock recovery functions in the fax machine to the received signal. However, these "analog" techniques (although implemented digitally) can only adapt to a limited extent, even when the fax machine is communicating with the ATA or gateway using digital PCM channels, e.g., ISDN or a direct connection from the fax engine and the PCM sample buffer. Moreover, compression often implemented by VoIP networks works well for speech (based on the limited frequency response of the human ear and our ability to "fill in the gaps" when certain sounds are missing from spoken words); however, distortion caused by compression and packetization can be enough to cause a fax transmission to fail at worst or to produce one or more erroneous image lines at best.

The above-mentioned T.38 fax protocol addresses at least a portion of the problems associated with sending and receiving faxes in real-time over a packet network. T.38 supports the transmission of fax data across an IP network in real time, much like the original Group 3 (G3) fax standards did for the traditional PSTN. In this manner, T.38 preserves the traditional fax environment and yet allows faxes to be successfully sent and received by transmitting packetized data (instead of PCM samples) over IP network. Without T.38, fax devices, which are sensitive to timing, would otherwise experience difficulty reliably sending and receiving faxes over an IP network, in which jitter, excessive latency and packet loss are common. However, T.38 is complex to implement, is processing resource intensive, and may not be sufficient to prevent the T.30-compatible fax engine 200 (FIG. 2) from data corruption when packet loss occurs in the network 110.

Figure 4:
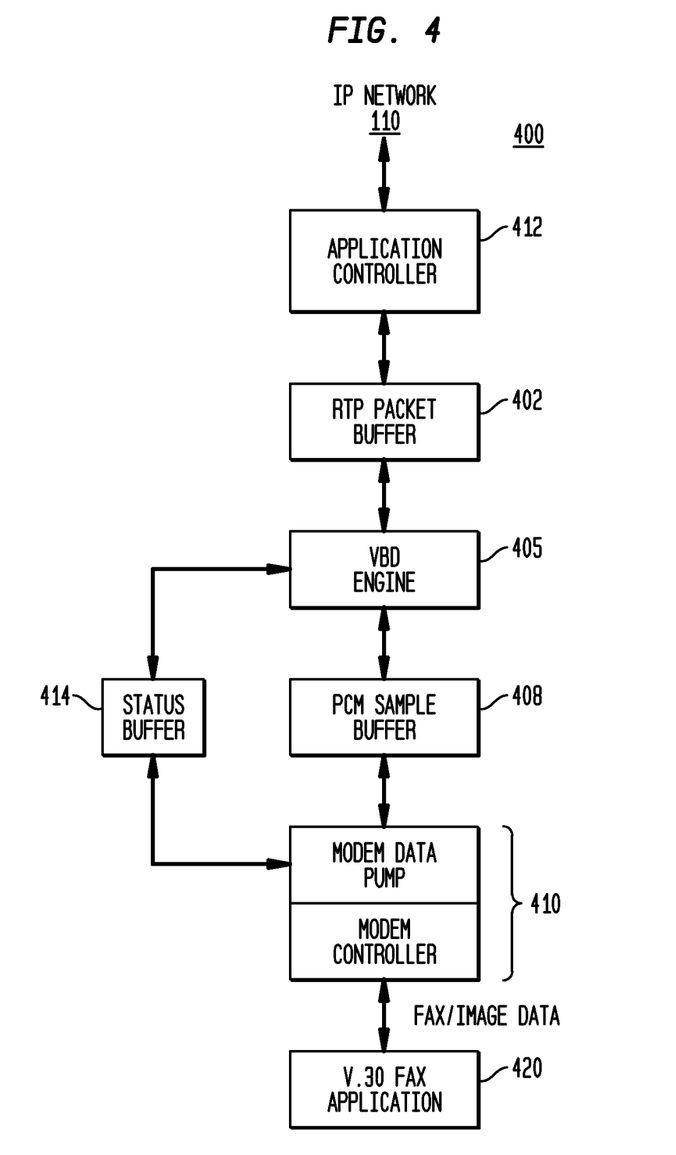
FIG. 4 is a block diagram depicting an illustrative dedicated IP-aware facsimile engine used in a dedicated FoIP facsimile machine application, according to an embodiment of the present invention.

In accordance with an embodiment of the invention, the exemplary block diagram of FIG. 4 depicts an exemplary IP-aware fax machine 400 that utilizes packet network impairment information to improve performance of the fax machine during network impairment, such as packet loss. It is to be appreciated that while the IP-aware fax machine 400 will be described in further detail below for a class 1 interface, this universal fax engine architecture can be similarly extended to a class 2 fax interface, as will become apparent to those skilled in the art given the teachings herein. Further, the invention is not limited to facsimile transmission and may be used in other communication applications utilizing an packet network.

Similar to the gateway/ATA 300 in FIG. 3, the IP-aware fax machine 400 has an application controller 412 coupled between the IP network 110 and a packet buffer 402, and a VBD engine 405 coupled between the packet buffer 402 and a PCM sample buffer 408. Because the IP-aware fax machine 400 is an integrated system, a modem 410, such as V.34 modem having a data pump and a controller, as described above, is coupled to the PCM sample buffer to receive and send PCM data therewith. A user interface V.30 fax application 420, implementing a V.30-compliant facsimile function (or other similar facsimile functionality application) as described above, interfaces with the modem 410 and receives and sends facsimile/image data therewith. The V.30 and other applications might be implemented on a computer or the like, or may be implemented in dedicated hardware or software.

In one embodiment, data and other information from the received packets (e.g., timing information, packet numbering, etc.) are stored in the buffer 402 in accordance with IETF RFC 3550 (2003) "RTP: A Transport Protocol for Real-Time Applications" incorporated herein by reference in its entirety. The VBD engine 405 converts the RTP-formatted packets in buffer 402 into PCM sample data for buffering by the buffer 408. Likewise, samples received by the PCM sample buffer 408 from the fax modem 410 are converted (e.g., reformatted) by the VBD engine 405 into RTP-formatted packets for buffering by the buffer 402. In this manner, PCM sample buffer 408 is operative to provide an interface between the fax application 420 and modem 410.

The PCM data generated by the VBD engine 405 are stored as frames in buffer 408, one or more PCM samples to a frame. In one embodiment, the VBD engine 405 converts each RTP-formatted packet into a PCM sample, and each PCM sample is formed into a frame. In another example, there might be one PCM sample frame generated by the VBD 405 for every two or more RTP-formatted packets in the buffer 402 and the number of packets it takes to make up PCM sample frame is not necessarily the same for all PCM sample frames. However, as will be discussed in more detail below, the number of packets used to make a PCM sample frame should be limited in view of a desired maximum time amount the modem 410 will take to process the frame.

As recited in the aforementioned V.152 standard, the VBD engine performs a conversion of packet data in the RTP-formatted packets into PCM data frames using, for example, a G.711 codec or the like (see, e.g., ITU-T Recommendation G.711 "Pulse Code Modulation (PCM) of Voice Frequencies, 1993, including Appendices I and II, incorporated herein by reference in their entirety). In addition, the G.711 codec detects if packets are missing (also referred to as packet loss), such as an out-of-order packet arriving after a waiting period has expired. In one embodiment, as the VBD engine 405 processes the RTP-formatted packets from buffer 402, the engine 405 flags or identifies each PCM frame, as the frame is stored in the buffer 408, as having been converted to PCM using bad or missing data if one or more of the incoming RTP-formatted packets were missing. In one embodiment, the VBD engine 405 substitutes dummy or replicated previous packet data for the missing packet data. The flags may be stored with the PCM frame data in the buffer 408, referred to here as in-band data, or stored separately in a status buffer 414 separate from the buffer 408, referred to here as out-of-band data. The in-band or out-of-band data might also include information regarding how full (or empty) the RTP packet buffer 402 is, useful in determining the level of network delay or jitter, indicia of the "quality" of the received packets from network 110.

Similarly, the modem 410 produces PCM sample data that might be organized in frames for the VBD engine 405 to process and produce RTP-formatted packets for further processing by application controller 412. Alternatively, the PCM sample data may be stored and processed as individual samples.

Although depicted as separate functional units, it is understood that the various blocks in FIG. 4 may be integrated together within the same block, either alone or with other functional blocks (e.g., circuitry, software modules, etc.).

Figure 5:
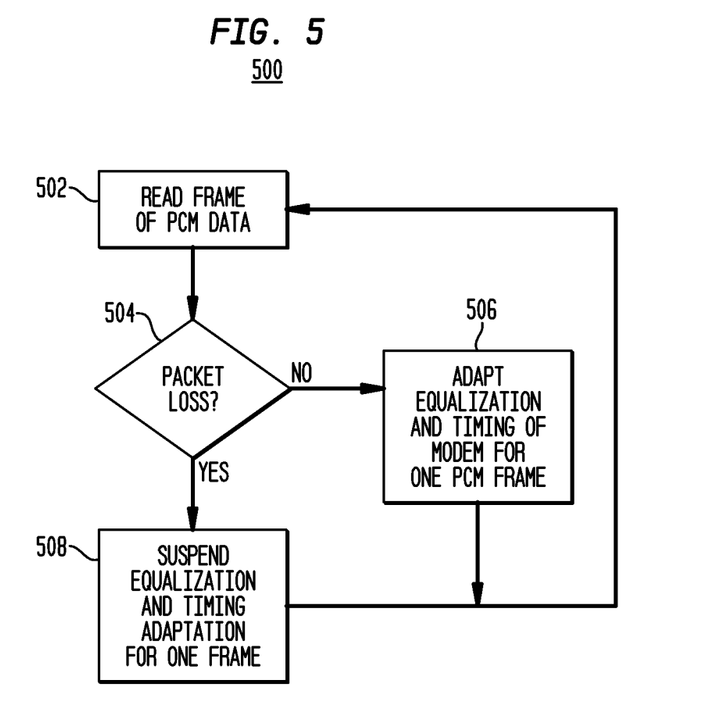
FIG. 5 is a flow chart illustrating operation of the facsimile machine of FIG. 4, according to an embodiment of the present invention.

Because dropped or delayed packets can disrupt operation of a fax machine, the machine of FIG. 4 suspends the adaptation of the various digital filters (equalizers) and clock recovery functions of the modem 410 when a packet is missing, lost, or delayed by a time interval greater than the time period of the PCM frame corresponding to the missing packet. The exemplary process 500 shown in FIG. 5 illustrates the suspension of the adaptation by the modem 410 when packets are not received from the network 110.

Beginning with step 502, a frame of PCM sample data is read from buffer 408 by the modem data pump in modem 410. In step 504, the pump checks to see if the PCM frame is flagged as being generated by the VBD engine 405 from RTP-formatted packets with missing packet data. The flag data is either retrieved from the PCM sample frames, when the data is stored with the PCM sample frames in the buffer 408 (in-band), or retrieved from the status buffer 414 (out-of-band). If the flag indicates that no packets were missing, then the equalizers or timing recovery function in the modem 410 adapts in step 506 using the PCM sample frame and the next frame is read in step 502. However, if the frame is flagged that packets were missing, then in step 508 for the time period that the frame is processed by the modem 410, the adaption of the equalizers or timing recovery is suspended. Then the next PCM sample frame is read in step 502. The above-mentioned adaption process occurs during the training of modem 410 when a facsimile communication is first started (the modem startup period) and during the facsimile communication to compensate for changing conditions of the communications channel over time.

In addition to the equalizers and timing recovery functions, during resynchronization of the modem 410 with the remote modem when a facsimile call switches from the control mode to the data mode, the receiver needs to detect various phase reversals in the incoming symbols as set forth in the V.34 standard. These phase reversals, generally referred to as S-to-$\overline{S}$ transitions, allows the receiver to start equalizer training at the beginning of the equalizer training sequence sent from the remote modem (see, e.g., section 12.5 of the aforementioned V.34 standard). When packets containing S signals are lost in the IP network 110, the modem 410, without knowing the occurrence of the packet loss, would stay in the $\overline{S}$ detecting state for an extended period of time and may miss the equalizer training sequence, causing the failure of the call. As illustrated by the exemplary process 600 shown in the flowchart of FIG. 6, the ability of the VBD engine 405 to inform the modem 410 that packets are missing allows the modem to skip the $\overline{S}$ detection step and start the equalization process.

Figure 6:
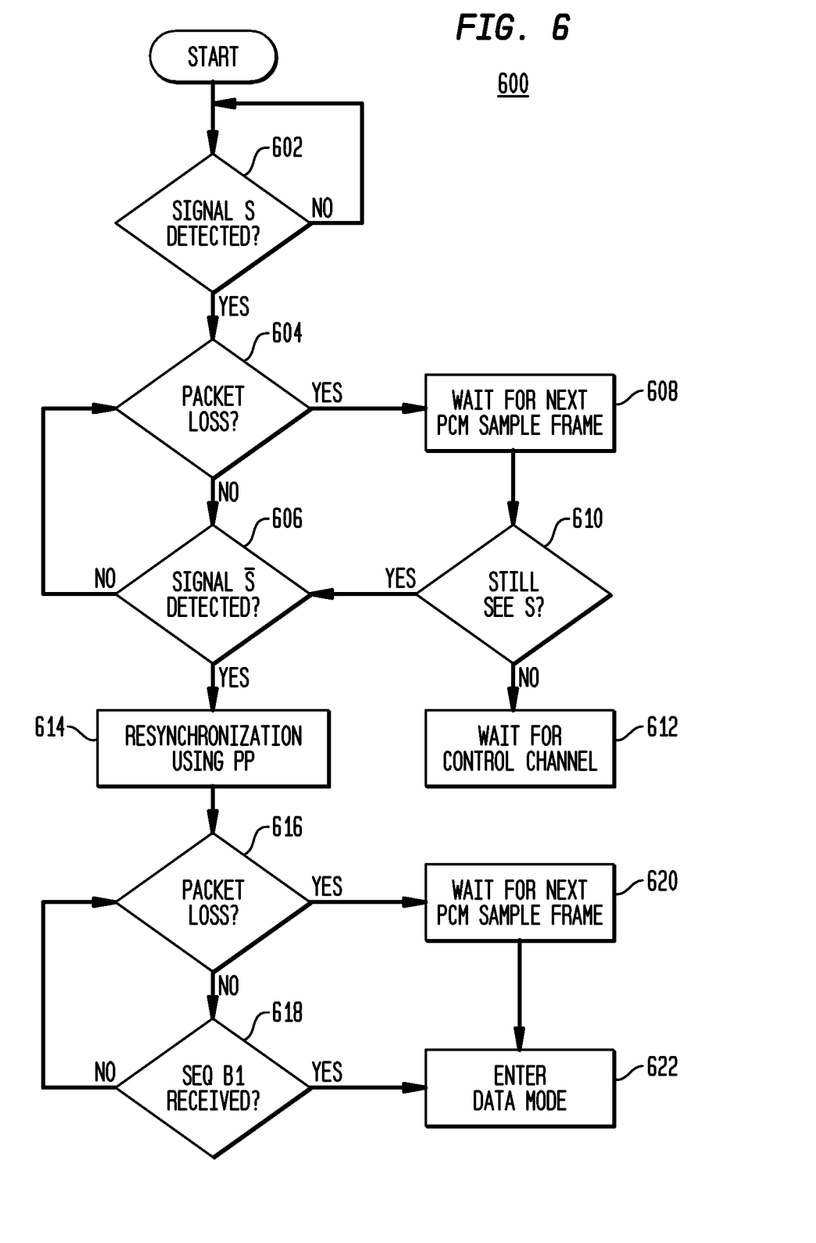
FIG. 6 is a flow chart illustrating operation of S and S̄ primary synchronizing of the facsimile machine of FIG. 4, according to an embodiment of the invention.

Beginning with step 602, the modem 410 monitors the incoming PCM data from the buffer 408 to look for the assertion of the S signal as defined in the above-described V.34 standard (see, e.g., section 10.1.3.7 of the aforementioned v.34 standard regarding the definition of the S and $\overline{S}$ signals). Then, in step 604, if a packet loss is not detected by the VBD 405 in the incoming packets, in step 606 the incoming PCM data is checked for the $\overline{S}$ signal. If no $\overline{S}$ signal is received, then steps 604 and 606 are repeated until a packet loss is detected or the $\overline{S}$ signal is received. If, in step 604, a packet loss is detected (indicated to the modem by the PCM sample frame being read by the modem being flagged as having been converted when packet loss occurred), then in step 608 the modem 410 waits until the next PCM sample frame without the error flag is read by the modem and, if the S signal is still being received in step 610, then control passes back to step 606 to continue to monitor for $\overline{S}$ or a packet loss. However, if the S signal is no longer being received in step 610, it is assumed that the $\overline{S}$ signal is lost due to the packet loss and the waiting for the control channel sequence from the transmitting modem begins in step 612 (see section 12.4 of the aforementioned V.34 standard for more detail of the control channel sequence).

Assuming that the $\overline{S}$ signal is received in step 606, then the modem 410 begins a resynchronization process using the PP signal (as defined in section 10.1.3.6 of the aforementioned V.34 standard) in step 614. Then in step 616 packet loss is checked by the modem 410 and if no loss occurred, the incoming PCM data is checked in step 618 for the beginning of the sequence B1 (as defined in section 10.1.3.1 of the aforementioned V.34 standard) and if not received, then control passes back to step 616. However, if the sequence B1 is received, then the modem 410 enters the data mode in step 622 to receive image data from the source modem. If, however, packet loss is detected in step 616 (indicated to the modem by the PCM sample frame being read by the modem being flagged as having been converted when packet loss occurred), then in step 620 the modem 410 waits until the next PCM sample frame without the error flag is read by the modem and the detection of the sequence B1 in step 618 is skipped and the modem enters the data mode in step 622.

As mentioned above, the number of samples in a PCM sample frame should not be so long that the modem 410 misses a substantial part of subsequent initialization sequence or required signal if a packet is dropped. For example, if the PCM frame is longer than 40 ms, then the beginning of the data transmission may be missed in step 622. Here, the time of a PCM sample frame is the number of PCM samples in the PCM frame divided by the sample rate (e.g., 8000 samples/second). Generally, for V.34 compatible modems, a PCM frame should be no longer than 20 ms (160 samples) or so, and can be as short as one sample (125 μs).

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack. Moreover, the embodiments herein are described in the context of facsimile transmission, the techniques described and claimed are also applicable to any voice-band modem, e.g., V.90, attached to an IP network using a VBD module, sometimes referred to as an IP-aware modem.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

It will be further understood that various changes in the details, materials, and arrangements of the parts which have been described and illustrated in order to explain the nature of this invention might be made by those skilled in the art without departing from the scope of the invention as expressed in the following claims.

The invention claimed is:

1. A method of operating an Internet Protocol (IP)-aware modem coupled to a packet network, the method comprising the steps of:
    receiving packets from the packet network;
    determining if one or more packets were missing from the received packets;
    setting at least one flag corresponding to the determined missing packets; and
    adapting at least one of an equalizer and a timing recovery element in the modem using data in the received packets;
    wherein the adapting is suspended for a period of time when one or more missing packets is detected; and
    wherein the step of adapting comprises:
        searching the received packets to detect a first synchronization signal;
        searching, after detecting the first synchronization signal, the received packets to detect a second synchronization signal; and
        skipping the step of searching for the second synchronization signal if the at least one flag is set.

2. The method of claim 1 further comprising the steps of:
    forming Pulse Code Modulated (PCM) sample frames from data in the received packets; and
    setting a flag corresponding to each PCM sample frame formed with one or more packets missing.

3. The method of claim 2 wherein each PCM sample frame has a time length and the period of time the adaptation of at least one of the equalizer and the timing recovery element is suspended is at least as long as the time length of a flagged PCM sample frame.

4. The method of claim 2 wherein the determining step is performed in a voice band data engine.

5. The method of claim 4, wherein the voice band data engine includes a V.711 codec.

6. The method of claim 4 further comprising the step of storing the received packets in a packet buffer prior to the forming and setting steps.

7. The method of claim 6 wherein the forming step comprising the step of converting, by a lossless codec, the buffered packets into PCM samples and storing the samples in a buffer to form the PCM sample frames.

8. The method of claim 2 wherein a flagged PCM sample frame has dummy data substituted for the one or more missing packets.

9. The method of claim 2 further comprising the step of:
    storing the PCM sample frames in a buffer, the modem processing the buffered PCM sample frames;
    wherein for at least one PCM sample frame a flag stored therewith indicates that the PCM sample frame was formed with one or more packets missing from the received packets.

10. The method of claim 2 further comprising the step of:
    storing the PCM sample frames in a PCM sample buffer, the modem processing the buffered PCM sample frames;
    wherein for at least one PCM sample frame, a flag corresponding to the at least one PCM sample frame is stored in a buffer separate from the PCM sample buffer and indicates to the modem that the PCM sample frame was formed with one or more packets missing from the received packets.

11. The method of claim 1 wherein the packets are Real-time Transport Protocol (RTP)-formatted and the modem is embedded in an IP-aware facsimile machine.

12. A method of operating an Internet Protocol (IP)-aware modem comprising the steps of:
receiving packets from a packet network;
buffering the received packets;
converting, by a lossless codec, the buffered packets into Pulse Code Modulated (PCM) sample;
storing the PCM samples in a PCM buffer to form PCM sample frames;
setting a flag corresponding to each PCM sample frame in the PCM buffer for which, during the converting step, one or more packets were missing from the buffered packets; and
adapting at least one of an equalizer and a timing recovery element in the modem using the buffered PCM sample data frames, and suspending adaptation for each PCM sample frame having a set flag;
wherein each PCM sample frame has a time length and the adaptation of at least one of the equalizer and the timing recovery element is suspended is for at least as long as the time length of a PCM sample frame having a set flag; and
wherein the step of adapting comprises:
searching the received packets to detect a first synchronization signal;
searching, after detecting the first synchronization signal, the received packets to detect a second synchronization signal; and
skipping the step of searching for the second synchronization signal if the at least one flag is set.

13. The method of claim 12 wherein the converting and setting steps are performed in a voice band data engine comprising the lossless codec.

14. The method of claim 12 wherein for at least one PCM sample frame the flag is stored with the PCM sample frame in the PCM buffer.

15. The method of claim 12 wherein, for at least one PCM sample frame, the flag corresponding to the at least one PCM sample frame is stored in a buffer separate from the PCM sample buffer.

16. A method of operating an Internet Protocol (IP)-aware modem coupled to a packet network, the method comprising the steps of:
receiving packets from a packet network;
buffering the received packets;
forming Pulse Code Modulated (PCM) sample frames from the buffered packets;
setting a flag corresponding to each PCM sample frame in the PCM buffer for which, during the forming step, one or more packets were missing from the buffered packets;
searching the PCM sample frames to detect a first synchronization signal;
searching, after detecting the first synchronization signal, the PCM sample frames to detect a second synchronization signal; and
skipping the step of searching for the second synchronization signal for each sample frame with a set flag.

17. The method of claim 16 wherein the IP-aware modem is compatible with a V.34 communication standard and first synchronization signal is S signal and the second synchronization signal is $\overline{S}$ signal.

18. The method of claim 16 further comprising the steps of:
searching, after detecting the second synchronization signal, the PCM sample frames to detect a third synchronization signal;
entering, if the third synchronization signal is detected, the modem into a data mode; and
entering the modem into the data mode whether or not the third synchronization signal is detected if the flag of a PCM sample frame searched in the step of searching for the third synchronization signal is set.

19. The method of claim 18 wherein the IP-aware modem is compatible with a V.34 communication standard and first synchronization signal is S signal, the second synchronization signal is $\overline{S}$ signal, and the third synchronization signal is the Seq B1 signal.

20. The method of claim 16 wherein the step of searching the PCM sample frames to detect a second synchronization signal is performed using PCM sample frames having flags not set.

21. The method of claim 16 wherein the forming step comprises the step of converting, by a lossless codec, the buffered packets into PCM samples and storing the samples in a buffer to form the PCM sample frames.

22. The method of claim 16 wherein the method is implemented by a machine executing program code encoded on a non-transitory machine-readable storage medium.

* * * * *